(12) United States Patent
Fujita

(10) Patent No.: US 11,143,074 B2
(45) Date of Patent: Oct. 12, 2021

(54) REAGENT DOSING SYSTEM AND METHOD

(71) Applicant: DELPHI TECHNOLOGIES IP LIMITED, St. Michael (BB)

(72) Inventor: Mahoro M. Fujita, Fairport, NY (US)

(73) Assignee: DELPHI TECHNOLOGIES IP LIMITED

( * ) Notice: Subject to any disclaimer, the term of this patent is extended or adjusted under 35 U.S.C. 154(b) by 155 days.

(21) Appl. No.: 16/526,057

(22) Filed: Jul. 30, 2019

(65) Prior Publication Data
US 2021/0033013 A1 Feb. 4, 2021

(51) Int. Cl.
*F01N 3/00* (2006.01)
*F01N 3/20* (2006.01)
*F01N 3/28* (2006.01)

(52) U.S. Cl.
CPC ......... *F01N 3/2066* (2013.01); *F01N 3/2896* (2013.01); *F01N 2610/02* (2013.01); *F01N 2610/146* (2013.01); *F01N 2610/1493* (2013.01); *F01N 2900/1806* (2013.01)

(58) Field of Classification Search
CPC .................. F01N 2610/1493; F01N 2610/146
USPC .......................................................... 60/285
See application file for complete search history.

(56) References Cited

U.S. PATENT DOCUMENTS

| | | | |
|---|---|---|---|
| 6,432,373 B1 * | 8/2002 | Tanazawa | B01D 53/8631 423/235 |
| 7,818,961 B2 | 10/2010 | Leonard | |
| 8,250,856 B2 * | 8/2012 | Ohashi | B01D 53/9459 60/286 |
| 8,393,144 B2 | 3/2013 | Habumuremyi et al. | |
| 8,459,012 B2 | 6/2013 | Sun et al. | |
| 9,353,660 B2 | 5/2016 | Jannot et al. | |
| 9,689,291 B2 | 6/2017 | Zhang et al. | |
| 10,138,785 B2 * | 11/2018 | Hiltunen | F01N 3/208 |
| 2009/0301064 A1 | 12/2009 | Maier et al. | |
| 2012/0299205 A1 * | 11/2012 | Lee | B01D 53/9409 261/27 |
| 2013/0101472 A1 * | 4/2013 | Lee | B01D 53/74 422/168 |
| 2015/0047326 A1 * | 2/2015 | Gardner | F01N 3/208 60/274 |
| 2015/0139859 A1 * | 5/2015 | Butzke | B01D 53/9477 422/110 |
| 2015/0204225 A1 * | 7/2015 | Wu | B01D 53/92 137/1 |

FOREIGN PATENT DOCUMENTS

| | | | | |
|---|---|---|---|---|
| EP | 1366802 A1 * | 12/2003 | ......... | B01D 53/9495 |
| EP | 3258077 A1 | 12/2017 | | |

* cited by examiner

*Primary Examiner* — Jason D Shanske
(74) *Attorney, Agent, or Firm* — Joshua M. Haines

(57) ABSTRACT

A reagent dosing system includes an injector having an outlet configured to be in fluid communication with the exhaust conduit; a reagent tank configured to hold a volume of reagent; a water tank configured to hold a volume of water; and a means for 1) pumping reagent from the reagent tank to the injector for injection of reagent into the exhaust conduit and 2) pumping water from the water tank to the injector for flushing residual reagent from the injector.

3 Claims, 10 Drawing Sheets

REAGENT DOSING SYSTEM AND METHOD

TECHNICAL FIELD OF INVENTION

The present invention relates to a reagent dosing system for dosing reagent for reducing $NO_x$ in an exhaust system, for example an exhaust system of an internal combustion engine. The present invention also relates to a method of operating a reagent dosing system.

BACKGROUND OF INVENTION

Combustion of fuel, for example in internal combustion engines, particularly lean burn engines such as Diesel engines, is known to produce exhaust gases where the exhaust gases may include oxides of nitrogen, hereinafter referred to as $NO_x$, as one component. Release of $NO_x$ into the atmosphere is undesirable, and consequently, treatment of the exhaust gases is needed to minimize the amount of $NO_x$ released into the atmosphere.

One technique that is commonly used to reduce $NO_x$ in the exhaust system of an internal combustion engine is known as selective catalytic reduction (SCR). In this technique, a SCR catalyst is provided in the exhaust system which, when in the presence of ammonia, converts $NO_x$ in the exhaust gases into diatomic nitrogen ($N_2$) and water ($H_2O$) prior to being released into the atmosphere. In order to provide ammonia for this reaction, a reagent, typically an aqueous urea solution, is injected into the exhaust stream through an injector. When the reagent is subjected to the heat of the exhaust gases, the reagent is thermally degraded into ammonia, thereby allowing the catalyst to react with the ammonia and exhaust gases to reduce $NO_x$.

When conversion of $NO_x$ is no longer needed, injection of reagent is stopped. In some systems, the reagent remaining in the injector is vacated, for example, by reversing a pump which pumps reagent to the injector during periods of operation of the internal combustion engine. Vacating the reagent from the injector prevents freezing of the reagent within the injector which could be harmful to the injector. However, components of the injector remain coated with reagent after the bulk of the reagent has been vacated from the injector. The reagent which coats the components of the injector may crystalize due to residual heat in the exhaust system. This crystallization of the residual reagent may prevent proper operation of the injector when injection of reagent is commanded in the future. For example, crystalized reagent may cause the injector to stick closed which prevents proper injection of reagent. Alternatively, the injector may be allowed to open, but may be prevented from closing properly, i.e. stick open, which may allow reagent to continuously leak into the exhaust when not desired, thereby leaving deposits in the exhaust system which may not be favorable for operation.

What is needed is a reagent dosing system and method which minimizes or eliminates one or more of the aforementioned shortfalls.

SUMMARY OF THE INVENTION

Briefly described, a reagent dosing system is provided for dosing reagent into an exhaust conduit. The reagent dosing system includes an injector having an outlet configured to be in fluid communication with the exhaust conduit; a reagent tank configured to hold a volume of reagent; a water tank configured to hold a volume of water; and a means for 1) pumping reagent from the reagent tank to the injector for injection of reagent into the exhaust conduit and 2) pumping water from the water tank to the injector for flushing residual reagent from the injector.

A method is also provided for operating a reagent dosing system which doses reagent into an exhaust conduit. The method includes a) using an injector to inject reagent into the exhaust conduit; and b) passing water through the injector after a).

The reagent dosing system and method as disclosed herein minimizes the likelihood of the injector becoming stuck open or stuck closed by minimizing the likelihood of reagent crystallizing.

BRIEF DESCRIPTION OF DRAWINGS

This invention will be further described with reference to the accompanying drawings in which.

DETAILED DESCRIPTION OF INVENTION

Figure 1:
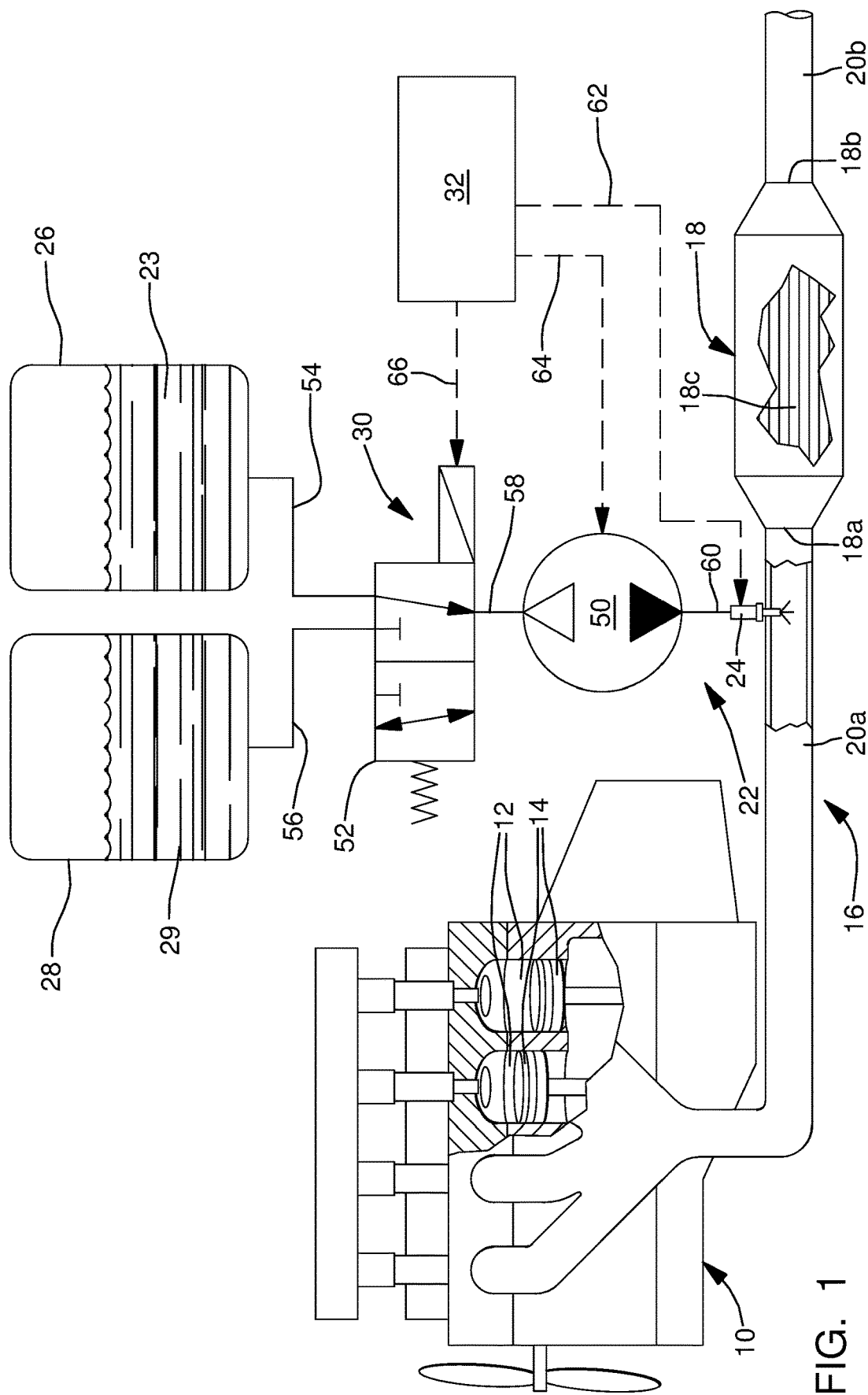
FIGS. 1-4 are views of an internal combustion engine, an exhaust system, and a reagent dosing system in different operational states in accordance with the present disclosure.

In accordance with a preferred embodiment of the present disclosure and referring initially to FIG. 1, an internal combustion engine 10 is illustrated which includes at least one combustion chamber 12, two of which are visible in FIG. 1, within which a mixture of fuel and air is combusted to cause respective pistons 14 to be reciprocated in order to generated movement, for example only, for propulsion of a motor vehicle (not shown). Internal combustion engine 10 produces exhaust gases resulting from the combustion of fuel and air where the exhaust gases may include oxides of nitrogen, hereinafter referred to as $NO_x$, as one component. Internal combustion engine 10 is connected to an exhaust system 16 which is in selective fluid communication with combustion chambers 12 through respective exhaust valves (not shown) of internal combustion engine 10. Exhaust system 16 is used to communicate the combustion gases away from internal combustion engine 10 and to at least partially purify the exhaust gases into less harmful components before being released to the atmosphere. While other purification devices, e.g. oxidation catalyst, particulate filter, etc., may be provided in exhaust system 16, exhaust system 16 includes at least a selective catalytic reduction (SCR) converter 18 which includes an SCR converter inlet 18a which receives combustion gases from internal combustion engine 10 through an exhaust conduit first portion 20a. SCR converter 18 also includes an SCR converter outlet 18b which is in fluid communication with an exhaust conduit second portion 20b which communicates the exhaust gases, which have been reduced in $NO_x$, away from SCR converter 18 and may be discharged to the atmosphere. Between SCR converter inlet 18a and SCR converter outlet 18b is an SCR catalyst 18c which may comprise a substrate such as a ceramic material and an active catalytic component. The active catalytic component, in the presence of ammonia, converts $NO_x$ in the exhaust gases into diatomic nitrogen ($N_2$) and water ($H_2O$). Many different materials for the active catalytic component are known to those of ordinary skill in the art of selective catalytic reduction, and may include, by way of non-limiting example only, one or more of vanadium, tungsten, zeolites, and a variety of precious metals which will not be discussed further herein.

In order for SCR converter 18 to convert $NO_x$ in the exhaust gases into diatomic nitrogen and water, exhaust system 16 also includes a reagent dosing system 22 for dosing reagent 23 into exhaust conduit first portion 20a upstream of SCR converter 18. Reagent 23 may be, by way of non-limiting example only, an aqueous urea solution, commonly referred to as diesel exhaust fluid (DEF) which is available as a solution of 32.5% urea and 67.5% deionized water and available commercially under the trade name AdBlue®. Reagent dosing system 22 includes an injector 24 which is electronically controlled and which injects reagent 23 into exhaust conduit first portion 20a, a reagent tank 26 which holds a volume of reagent 23 to be supplied to injector 24, a water tank 28 which holds a volume of water 29 to be supplied to injector 24, a means 30 for 1) pumping reagent 23 from reagent tank 26 to injector 24 for injection of reagent 23 into exhaust conduit first portion 20a and 2) pumping water 29 from water tank 28 to injector 24 for flushing residual reagent 23 from injector 24, and a reagent dosing system controller 32 in electrical communication with means 30 and injector 24 for control thereof. When reagent 23 is injected into exhaust conduit first portion 20a, reagent 23 is thermally degraded into ammonia which is communicated to SCR catalyst 18c for conversion of $NO_x$ in the exhaust gases into diatomic nitrogen and water, the process of which is widely known to those of ordinary skill in the art and will not be described further described herein. As used herein, water 29 includes not only pure water ($H_2O$), but also includes water with impurities that do not adversely affect the desired outcome of minimizing or eliminating residual reagent 23 from injector 24 and minimizing or eliminating the possibility of injector 24 sticking open or sticking closed and also includes solutions with water as the main component where additional components do not adversely affect the desired outcome of minimizing or eliminating residual reagent 23 from injector 24 and minimizing or eliminating the possibility of injector 24 sticking open or sticking closed. Furthermore, water 29 may be collected, at least in part, from one or more of air conditioning condensation, atmospheric moister, or atmospheric precipitation.

Figure 5:
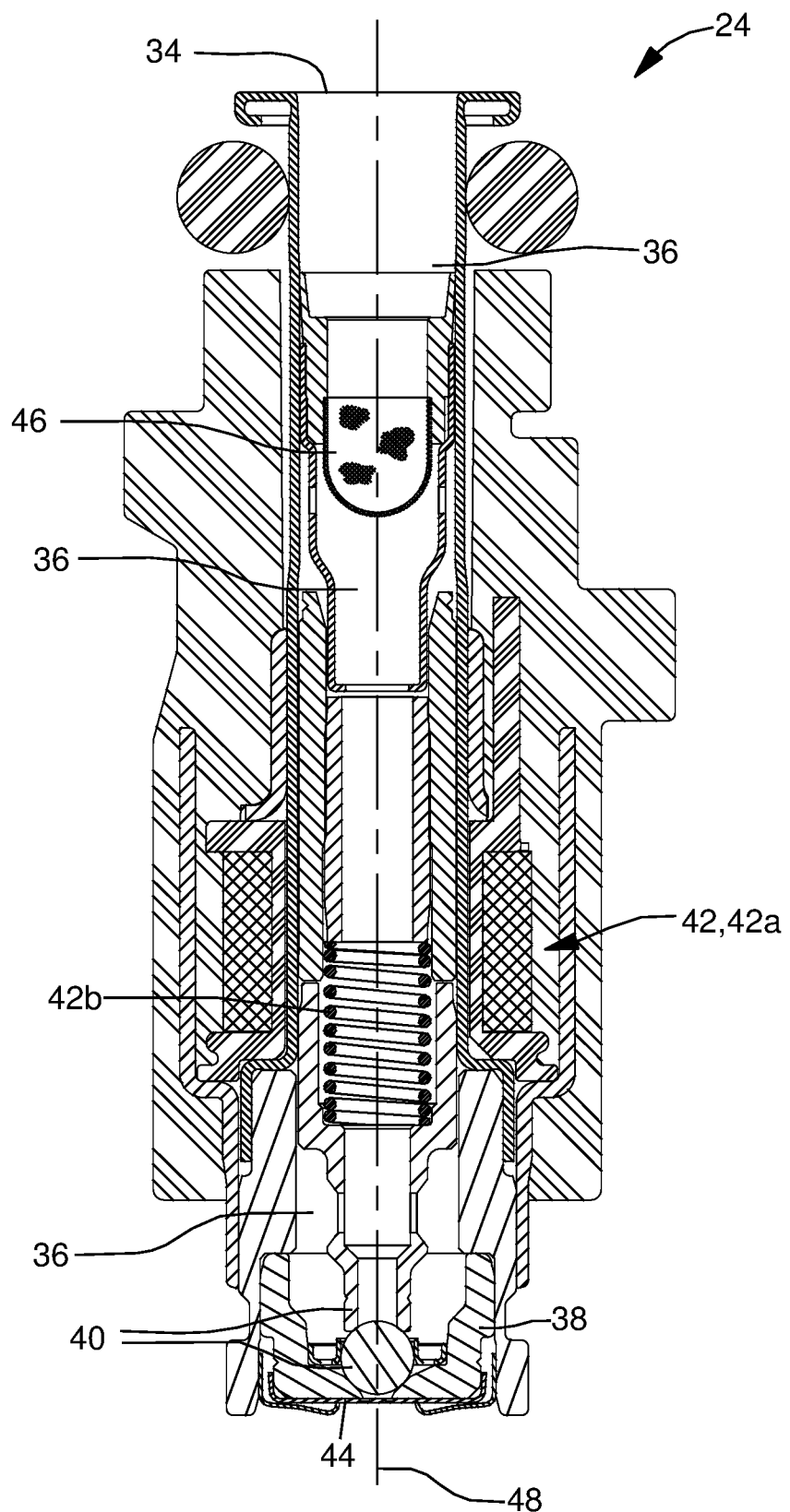
FIG. 5 is a cross-sectional view of an injector of the reagent dosing system.
Figure 6:
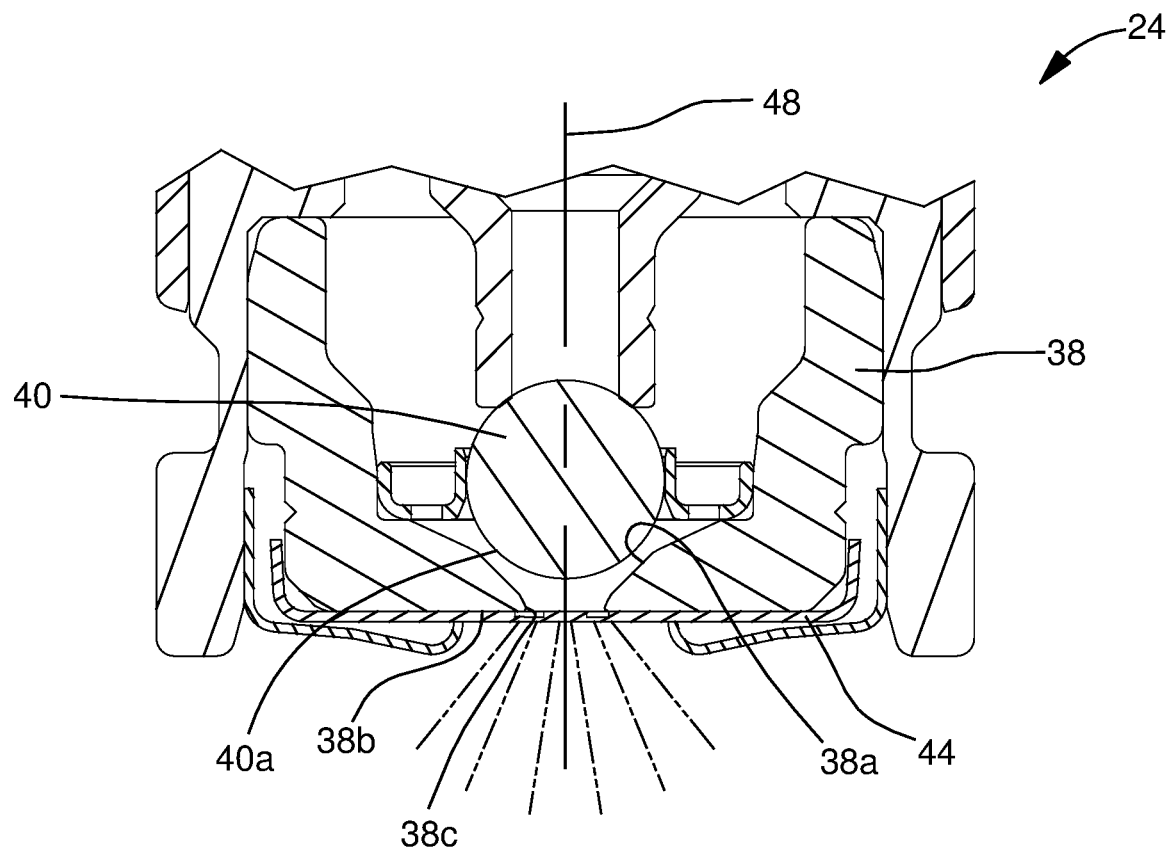
FIG. 6 is an enlarged portion of FIG. 5.

Referring now to FIGS. 5 and 6, injector 24 generally includes an injector inlet 34 which communicates fluid into injector 24, an injector conduit 36 which receives fluid from injector inlet 34 where injector conduit 36 may comprise several individual elements as shown, a valve seat 38 in injector conduit 36 and downstream of injector inlet 34, a valve member 40 which is disposed within injector conduit 36 and which controls flow of fluid through injector 24 by selectively seating and unseating with valve seat 38, an actuator 42 which imparts movement on valve member 40 to seat and unseat valve member 40 with valve seat 38, and a director plate 44 which shapes and atomizes fluid exiting injector 24. While injector inlet 34 is primarily used to communicate fluid into injector 24, injector inlet 34 also provides a path out of injector 24 when injector 24 is being purged of reagent 23 and/or water 29 as will become clearer in the subsequent description. A filter 46 may be provided in injector conduit 36 between injector inlet 34 and valve seat 38 in order to prevent foreign matter that may be present in fluid entering injector inlet 34 from reaching valve seat 38 and passing through injector 24.

Valve seat 38 includes a valve seat upstream surface 38a proximal to injector inlet 34 and a valve seat downstream surface 38b distal from injector inlet 34. A valve seat aperture 38c extends through valve seat 38, thereby joining valve seat upstream surface 38a and valve seat downstream surface 38b such that valve seat aperture 38c is centered about, and extends through valve seat 38 along a fluid injector axis 48. Valve seat aperture 38c serves as an outlet which is in fluid communication with exhaust conduit first portion 20a. As shown, valve seat upstream surface 38a may be a surface of revolution, and may include discrete sections that are each frustoconical and centered about fluid injector axis 48. Also as shown, valve seat downstream surface 38b may be planar and perpendicular to fluid injector axis 48. Valve member 40 includes a valve member surface 40a which is configured to provide sealing between valve member surface 40a and valve seat downstream surface 38b of valve seat 38 when valve member 40 is seated with valve seat 38. As shown, valve member surface 40a may be spherical. While an enabling embodiment of valve seat 38 and valve member 40 have been provided herein, it will be well understood to a person of ordinary skill in the art of fluid injectors that numerous other geometries may be provided which allow for positive sealing between valve seat 38 and valve member 40.

As illustrated herein actuator 42 may comprise a solenoid 42a and a return spring 42b. When actuator 42 is energized, a magnetic field is generated which attracts valve member 40, thereby moving valve member 40 upward as oriented in the figures to an open position as shown in FIG. 6 which unblocks and allows fluid communication through valve seat aperture 38c. Conversely, when actuator 42 is de-energized, the magnetic field ceases, thereby allowing return spring 42b to move valve member 40 downward as oriented the figures to a closed position as shown in FIG. 5 which blocks and prevents fluid communication through valve seat aperture 38c. In this way, valve member 40 is moveable between the closed position and the open position to precisely time when fluid is discharged from injector 24. Solenoids, their individual elements, and their operation are well known to a person of ordinary skill in the art of fluid injection valves, and consequently, actuator 42 will not be described in greater detail herein. Furthermore, while actuator 42 has been illustrated as including solenoid 42a and return spring 42b, it will be well understood to a person of ordinary skill in the art of fluid injectors that other actuators may alternatively be used, and may be, by way of non-limiting example only, hydraulic actuators, piezoelectric actuators, and the like or combinations thereof.

As described above, seating and unseating of valve member 40 with valve seat 38 controls flow of fluid through valve seat aperture 38c. Consequently, valve member 40 and valve seat 38 are used to time when fluid is discharged from injector 24. In order to control the shape of the fluid that is discharged from injector 24 and to atomize the fluid that is discharged from injector 24, director plate 44 is provided downstream of valve seat 38 which receives fluid from valve seat aperture 38c such that features are formed in one or both of valve seat 38 and director plate 44 which provide shaping and atomization.

As embodied in the figures, and now referring to FIGS. 1-4, means 30 includes a pump 50 and a diverter valve 52. A reagent conduit 54 provides fluid communication between reagent tank 26 and diverter valve 52, and similarly, a water conduit 56 provides fluid communication between water tank 28 and diverter valve 52. A valve-pump conduit 58 provided fluid communication between diverter valve 52 and pump 50 while a pump-injector conduit 60 provides fluid communication between pump 50 and injector 24.

Diverter valve 52, illustrated schematically by way of non-limiting example only in the figures as a solenoid actuated valve, is positionable between at least two positions. In a first position illustrated in FIGS. 1 and 2, diverter valve 52 simultaneously provides fluid communication between reagent conduit 54 and valve-pump conduit 58 and prevents fluid communication between water conduit 56 and valve-pump conduit 58. In a second position illustrated in FIGS. 3 and 4, diverter valve 52 simultaneously prevents fluid communication between reagent conduit 54 and valve-pump conduit 58 and provides fluid communication between water conduit 56 and valve-pump conduit 58. While two positions have been illustrated, it should be understood that a third position of diverter valve 52 may be provided which simultaneously prevents fluid communication between reagent conduit 54 and valve-pump conduit 58 and prevents fluid communication between water conduit 56 and valve-pump conduit 58.

Pump 50, illustrated schematically in the figures may be, by way of non-limiting example only, a bi-directional pump which is configured to pump reagent 23 and water 29 to injector 24, to pump reagent 23 from injector 24 to reagent tank 26, and to pump water 29 from injector 24 to water tank 28 as will be described in greater detail later. Pump 50 may be, by way of non-limiting example only, constructed as disclosed in United States Patent Application Publication No. US 2009/0301064 A1 to Maier et al., the disclosure of which is hereby incorporated by reference in its entirety. However, a practitioner of ordinary skill in the art will readily recognize that other types of pumps may alternatively be utilized.

Reagent dosing system controller 32 is in electrical communication with injector 24 through an injector conductor 62, is in electrical communication with pump 50 through a pump conductor 64, and is in electrical communication with diverter valve 52 through a diverter valve conductor 66. Reagent dosing system controller 32 is configured to send a control signal to injector 24 through injector conductor 62, thereby controlling injection of reagent 23 and water 29 through injector 24, including starting, stopping, and rate of injection. Reagent dosing system controller 32 is also configured to send a control signal to pump 50 through pump conductor 64, thereby controlling pumping of reagent 23 and water 29, including starting, stopping, rate, and direction of pumping. Reagent dosing system controller 32 is also configured to send a control signal to diverter valve 52 through diverter valve conductor 66, thereby controlling the position of diverter valve 52. Reagent dosing system controller 32 may include a processor (not shown) such as a microprocessor or other control circuitry such as analog and/or digital control circuity including an application specific integrated circuit (ASIC) for processing data as is known to those or ordinary skill in the art. Reagent dosing system controller 32 may also include memory (not shown) including non-volatile memory, such as electrically erasable programmable read-only memory (EEPROM) for storing one or more routines, thresholds, and captured data. The one or more routines may be executed by the processor to perform steps to operate injector 24, pump 50, and diverter valve 52 under various operating conditions of internal combustion engine 10. While reagent dosing system controller 32 has been illustrated herein as a single controller, it should be understood that reagent system controller may include multiple individual controllers.

Figure 2:
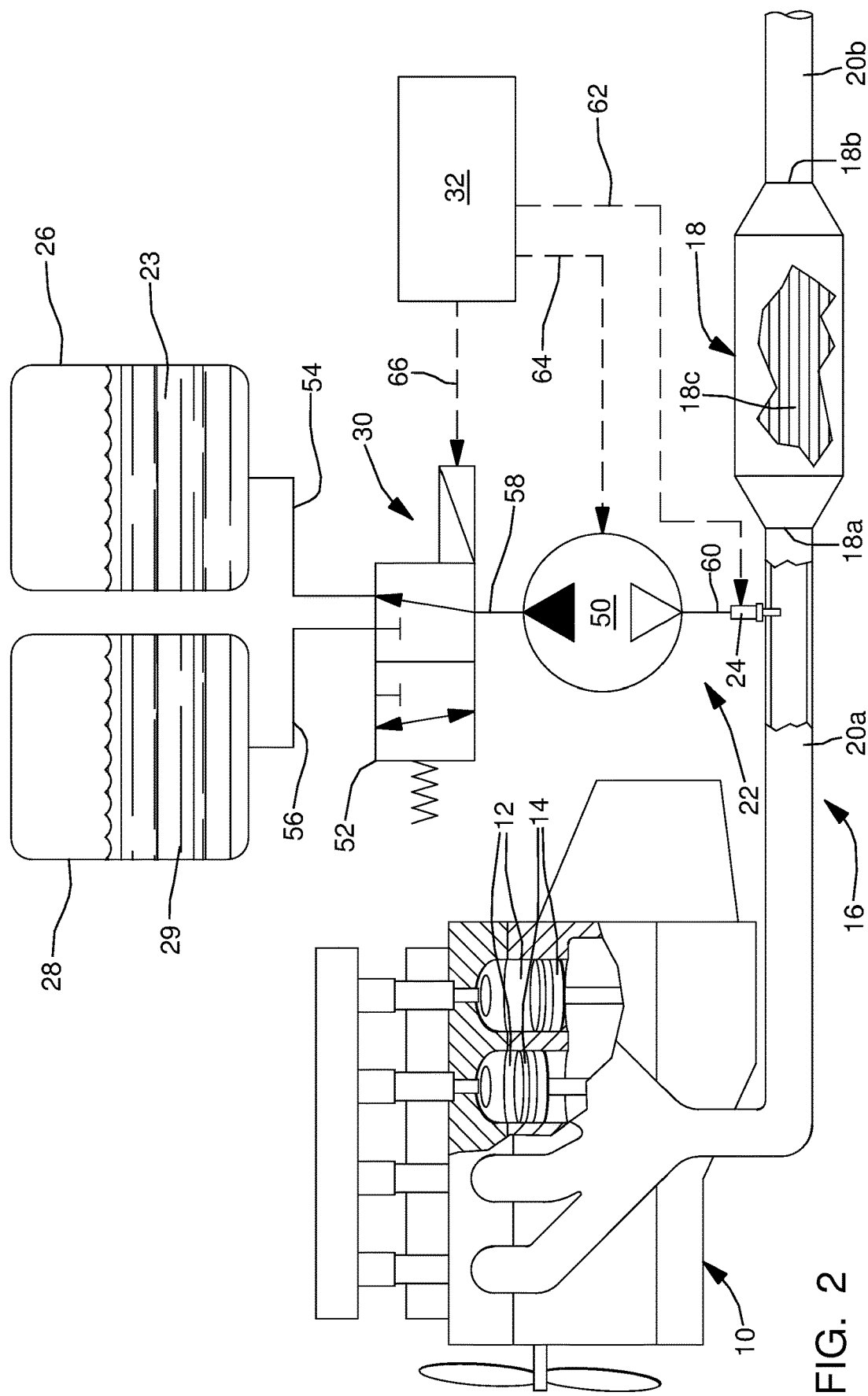
Figure 3:
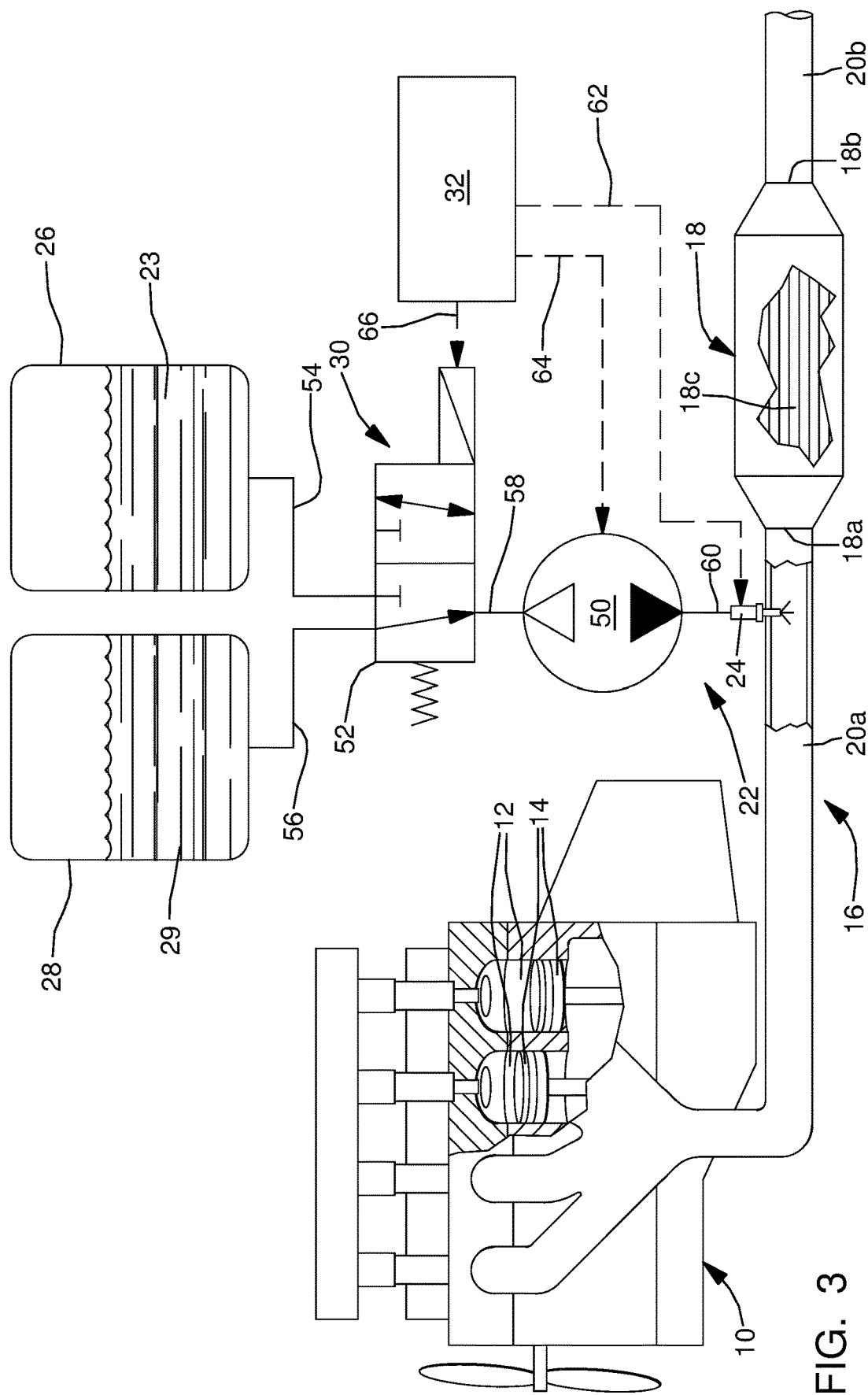
Figure 4:
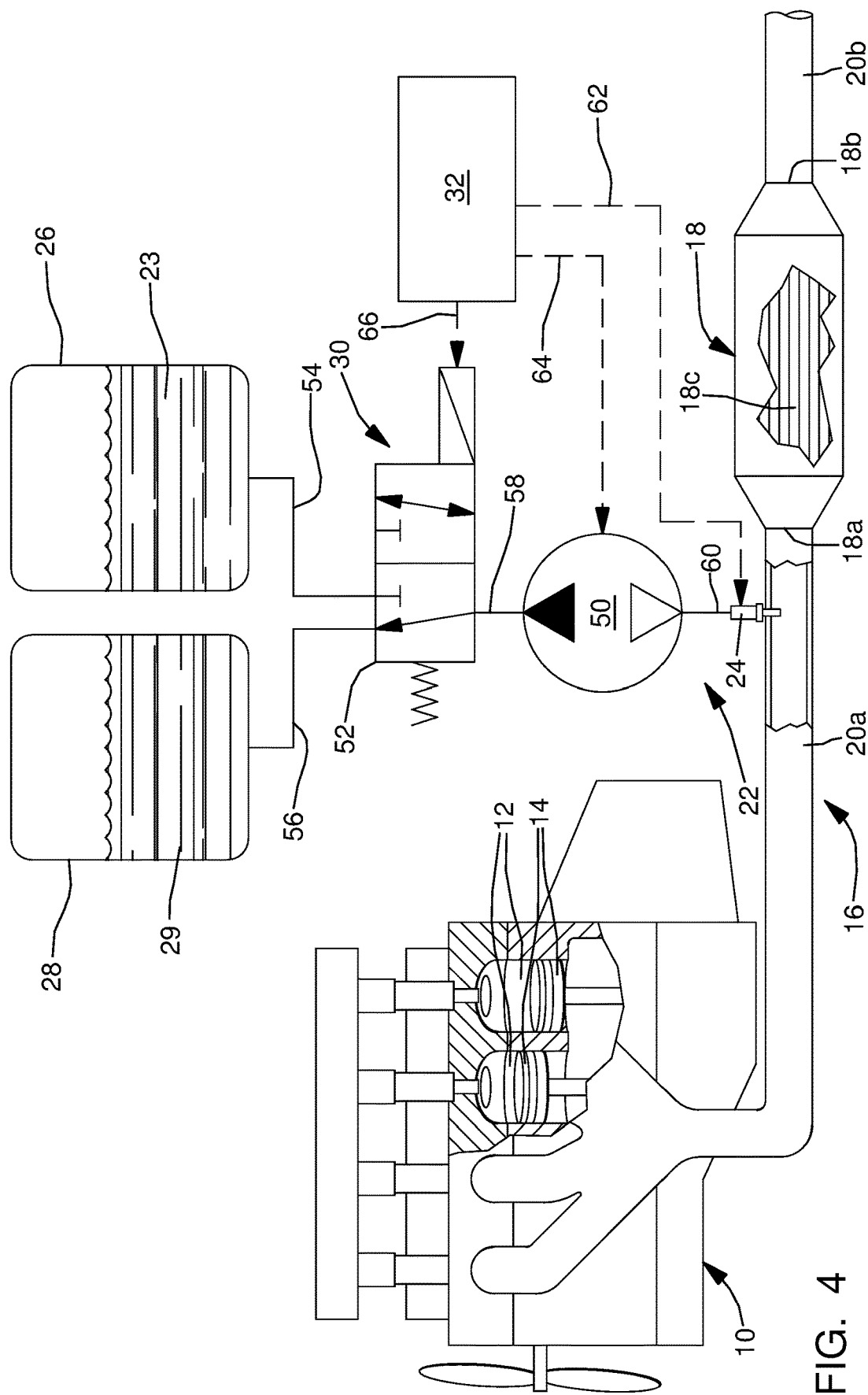

In use, as illustrated in FIG. 1, when internal combustion engine 10 is operating and producing exhaust which is communicated to exhaust system 16 and which requires injection of reagent 23, diverter valve 52 is positioned in the first position which provides fluid communication between reagent tank 26 and pump 50 and which prevents fluid communication between water tank 28 and pump 50. Furthermore, pump 50 is operated to pump reagent 23 from reagent tank 26 to injector 24 where injector 24 is operated to inject the reagent 23 into exhaust conduit first portion 20a at the desired rate based on operational conditions of internal combustion engine 10. Now, when use of exhaust system 16 is going to be discontinued, for example when internal combustion engine 10 is going to be turned off, or when internal combustion engine 10 is operating in a condition which does not require injection of reagent 23, it may be desirable to purge injector 24 of reagent 23 and clean injector 24 of residual reagent 23 in order to minimize the possibility of injector 24 being either stuck open or stuck closed in future operation due to crystallization of residual reagent 23 or to minimize the possibility of injector 24 being damaged due to freezing. Referring now to FIG. 2, in order to initiate this process, diverter valve 52 remains in the first position and operation of injector 24 is continued, thereby continuing opening and closing of injector 24. However, pump 50 is operated to pump reagent 23 from injector 24 to reagent tank 26, thereby vacating the bulk of reagent 23 from injector 24, valve-pump conduit 58, and pump-injector conduit 60. However, the components of injector 24 may remain coated with residual reagent 23 which could crystallize and cause valve member 40 to either stick open or stick closed in future operation. In order to eliminate any remaining reagent 23 which may coat the components of injector 24, and now referring to FIG. 3, diverter valve 52 is moved to the second position which provides fluid communication between water tank 28 and pump 50 and which prevents fluid communication between reagent tank 26 and pump 50. Furthermore, pump 50 is operated to pump water 29 from water tank 28 to injector 24 where injector 24 is operated to inject water 29 into exhaust conduit first portion 20a, thereby flushing any residual reagent 23 from the components of injector 24. Referring now to FIG. 4, in order to prepare injector 24 for future dosing of reagent 23 and to prevent the potential for water 29 to freeze within injector 24, diverter valve 52 remains in the second position and operation of injector 24 is continued, thereby continuing opening and closing of injector 24. Furthermore, pump 50 is operated to pump water 29 from injector 24 to water tank 28, thereby vacating water 29 from injector 24 and preparing injector 24 for future injection of reagent 23. Since residuals of reagent 23 are removed from the components of injector 24, particularly valve seat 38, valve member 40, and director plate 44, by passing water 29 through injector 24, crystallization of residual reagent 23 is minimized or eliminated, thereby also minimizing the likelihood of injector 24 becoming stuck open or stuck closed.

While means 30 has been embodied herein as having pump 50 and diverter valve 52 which represents the least number of components, it should be understood that means 30 may include additional pumps and valves to achieve the same functionality. For example, separate pumps may be provided for pumping reagent 23 and water 29. When separate pumps are utilized, it may be necessary to provide a valve for each pump. In another example, one pump may be used to pump reagent 23 and water 29 to injector 24 while another pump may be used to pump regent 23 and water 29 in the opposite direction. Again, it may be necessary to provide additional valves for each pump to achieve desired isolation of reagent 23 and water 29 in the various modes of operation.

Reference will now be made to FIGS. 7-10 which are similar to FIGS. 1-4, and consequently only the differences will be described. Internal combustion engine 10 includes an exhaust system 116 which is the same as exhaust system 16 except that reagent dosing system 22 is replaced with a reagent dosing system 122 and means 30 is replaced with means 130. Furthermore, means 130 is the same as means 30 except that diverter valve 52 is replaced with a diverter valve 152 which will be described in greater detail in the paragraphs that follow.

Diverter valve 152, illustrated schematically by way of non-limiting example only in the figures as a solenoid actuated valve, is positionable between at least three positions. The main distinction of diverter valve 152 is inclusion of an air inlet 168, the purpose of which will be apparent from the subsequent description of diverter valve 152. In a first position illustrated in FIGS. 7 and 8, diverter valve 152 simultaneously provides fluid communication between reagent conduit 54 and valve-pump conduit 58, prevents fluid communication between water conduit 56 and valve-pump conduit 58, and prevents fluid communication between air inlet 168 and valve-pump conduit 58. In a second position illustrated in FIG. 9, diverter valve 152 simultaneously prevents fluid communication between reagent conduit 54 and valve-pump conduit 58, provides fluid communication between water conduit 56 and valve-pump conduit 58, and prevents fluid communication between air inlet 168 and valve-pump conduit 58. In a third position illustrated in FIG. 10, diverter valve 152 simultaneously prevents fluid communication between reagent conduit 54 and valve-pump conduit 58, prevents fluid communication between water conduit 56 and valve-pump conduit 58, and permits fluid communication between air inlet 168 and valve-pump conduit 58. While air inlet 168 has been illustrated as drawing air directly from the atmosphere, it should be understood that conditioning of the air may be provided, for example through a filter and/or a moisture separator which removes foreign matter such as dirt and/or moisture and the filter may be common to the air intake of internal combustion engine 10. Furthermore, while three positions have been illustrated, it should be understood that a fourth position of diverter valve 152 may be provided which simultaneously prevents fluid communication between reagent conduit 54 and valve-pump conduit 58, prevents fluid communication between water conduit 56 and valve-pump conduit 58, and prevents fluid communication between air inlet 168 and valve-pump conduit 58.

Figure 7:
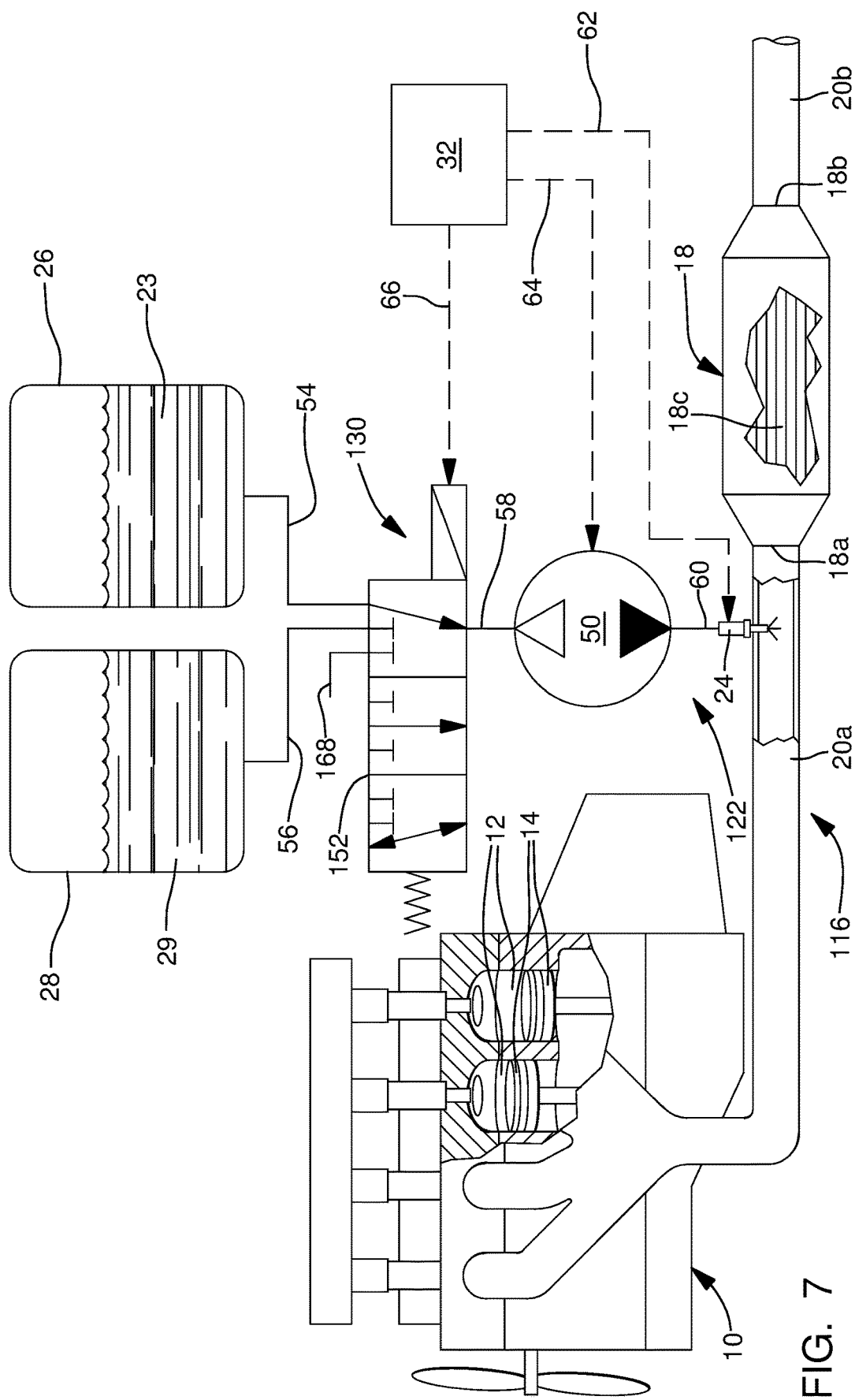
FIGS. 7-10 are views of an internal combustion engine, an exhaust system, and another reagent dosing system in different operational states in accordance with the present disclosure.
Figure 8:
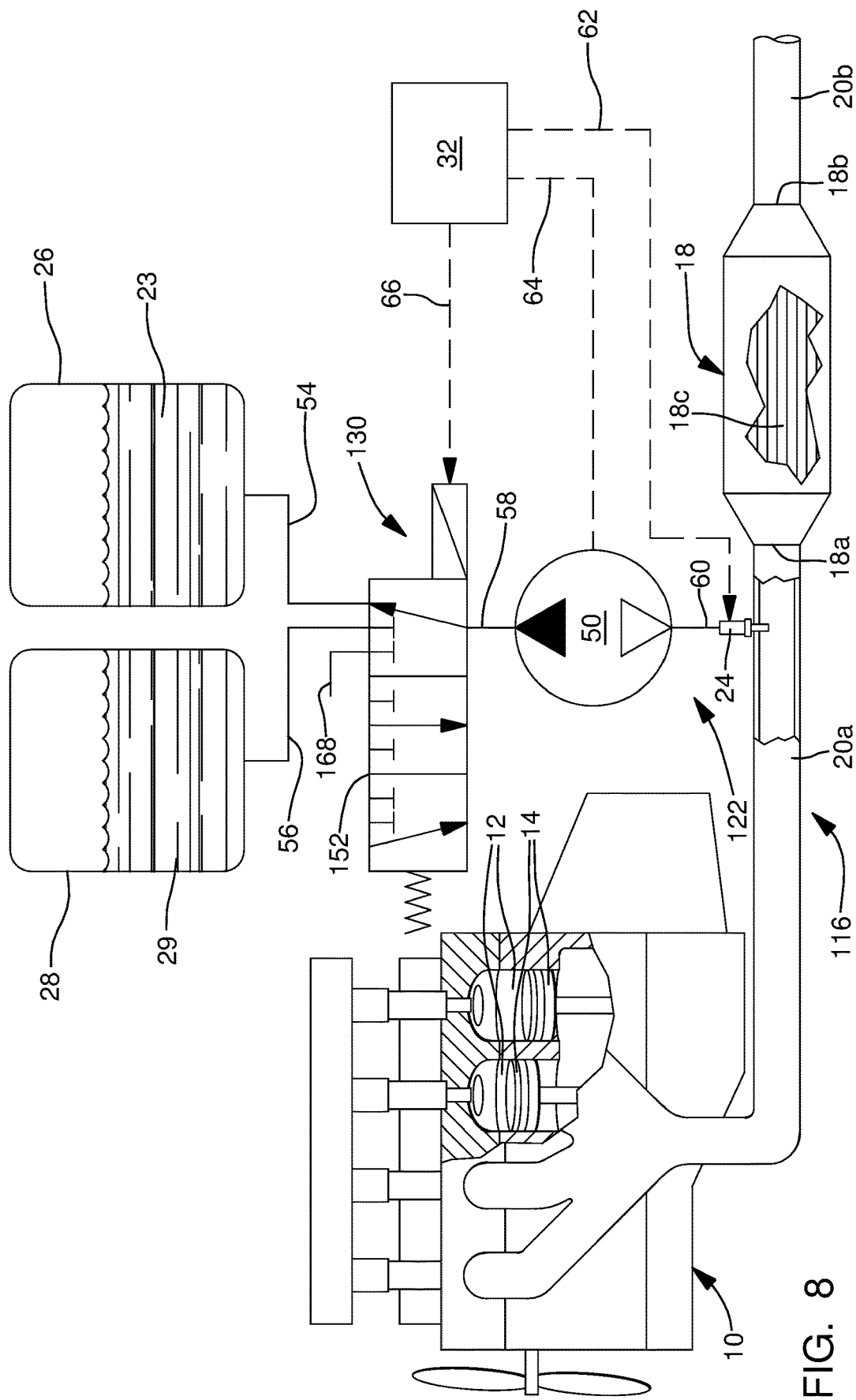
Figure 9:
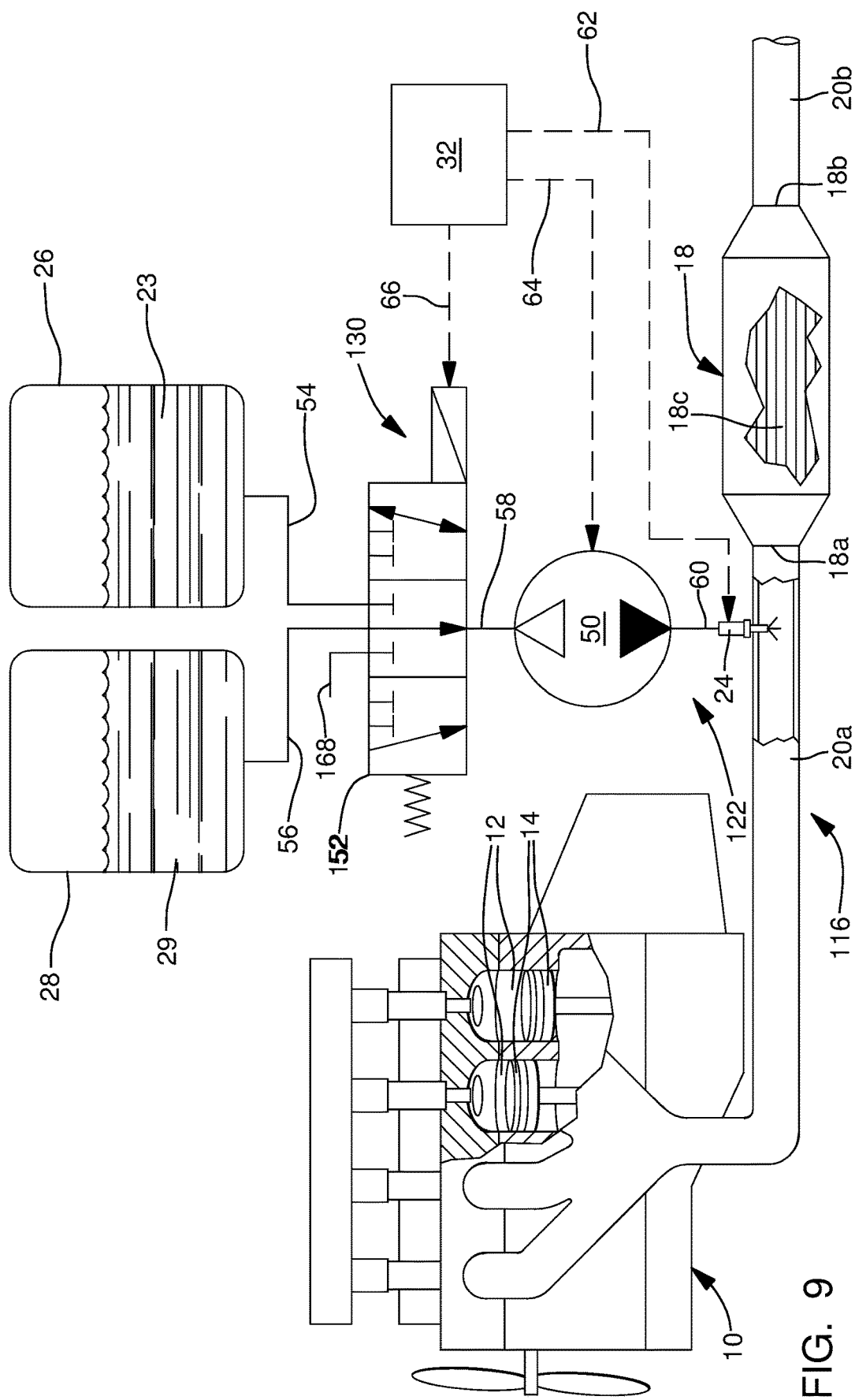
Figure 10:
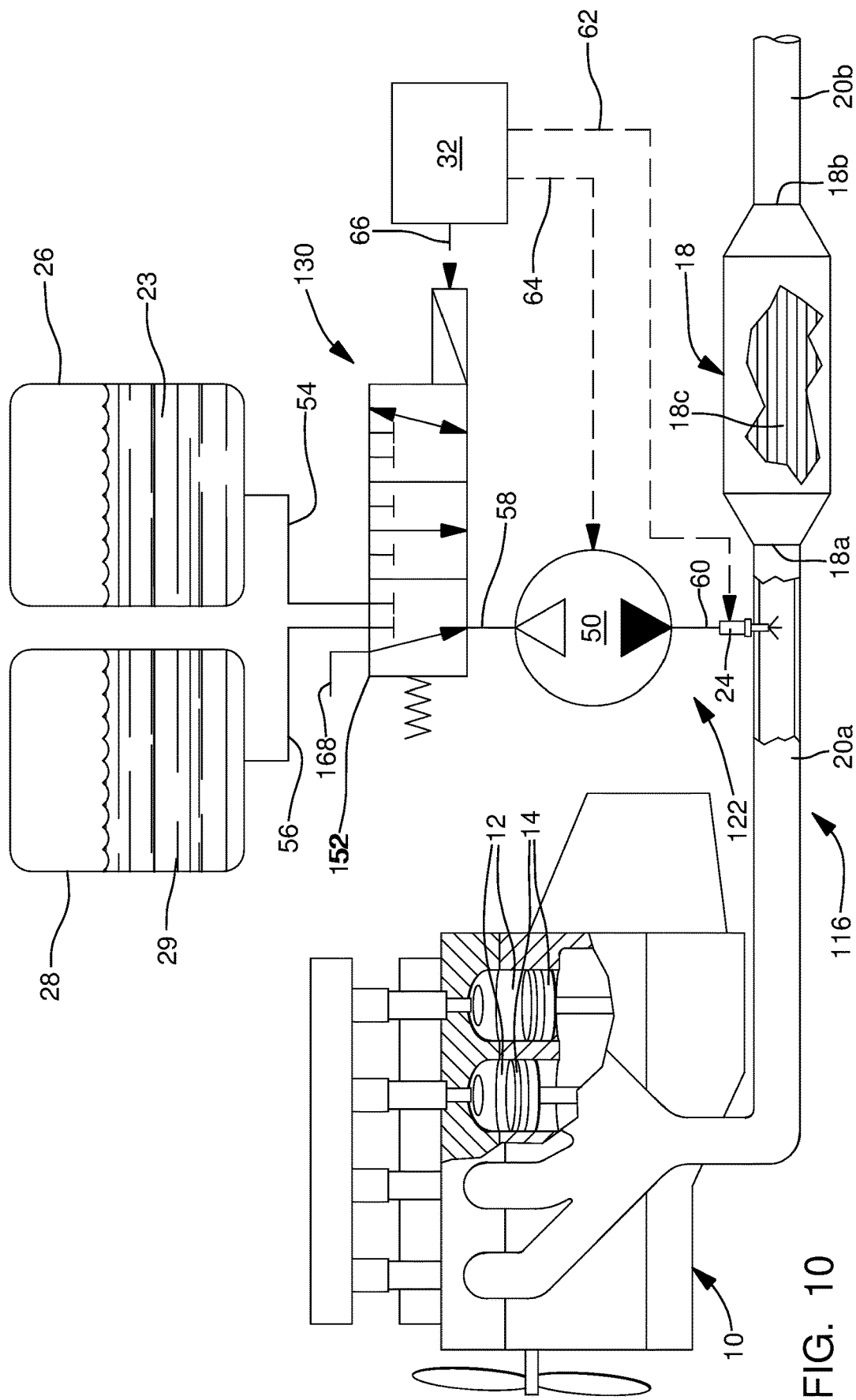

In use, as illustrated in FIG. 7, when internal combustion engine 10 is operating and producing exhaust which is communicated to exhaust system 116 and which requires injection of reagent 23, diverter valve 152 is positioned in the first position which provides fluid communication between reagent tank 26 and pump 50, prevents fluid communication between water tank 28 and pump 50, and prevents fluid communication between air inlet 168 and pump 50. Furthermore, pump 50 is operated to pump reagent 23 from reagent tank 26 to injector 24 where injector 24 is operated to inject reagent 23 into exhaust conduit first portion 20a at the desired rate based on operational conditions of internal combustion engine 10. Now, when use of exhaust system 116 is going to be discontinued, for example when internal combustion engine 10 is going to be turned off, or when internal combustion engine 10 is operating in a condition which does not require injection of reagent 23, it may be desirable to purge injector 24 of reagent 23 and clean injector 24 of residual reagent 23 in order to minimize the possibility of injector 24 being either stuck open or stuck closed in future operation due to crystallization of residual reagent 23 or being damaged due to freezing. Referring now to FIG. 8, in order to initiate this process, diverter valve 152 remains in the first position and operation of injector 24 is continued, thereby continuing opening and closing of injector 24. However, pump 50 is operated to pump reagent 23 from injector 24 to reagent tank 26, thereby vacating the bulk of reagent 23 from injector 24, valve-pump conduit 58, and pump-injector conduit 60. However, the components of injector 24 may remain coated with residual reagent 23 which could crystallize and cause valve member 40 to either stick open or stick closed in future operation. In order to eliminate any remaining reagent 23 which may coat the components of injector 24, and now referring to FIG. 9, diverter valve 152 is moved to the second position which provides fluid communication between water tank 28 and pump 50, prevents fluid communication between reagent tank 26 and pump 50, and prevents fluid communication between air inlet 168 and pump 50. Furthermore, pump 50 is operated to pump water 29 from water tank 28 to injector 24 where injector 24 is operated to inject water 29 into exhaust conduit first portion 20a, thereby flushing any residual reagent 23 from the components of injector 24. Referring now to FIG. 10, in order to prepare injector 24 for future dosing of reagent 23 and to prevent the potential for water 29 to freeze within injector 24, diverter valve 152 is moved to the third position which, permits fluid communication between air inlet 168 and pump 50, prevents fluid communication between reagent tank 26 and pump 50, and prevents fluid communication between water tank 28 and pump 50. Furthermore, pump 50 is operated to pump air from air inlet 168 to injector 24 where injector 24 is operated to inject air into exhaust conduit first portion 20a in order to purge injector 24 of water 29, thereby vacating water 29 from injector 24 and preparing injector 24 for future injection of reagent 23. Since residuals of reagent 23 are removed from the components of injector 24, particularly valve seat 38, valve member 40, and director plate 44, by passing water 29 through injector 24, crystallization of residual reagent 23 is minimized, thereby also minimizing the likelihood of injector 24 becoming stuck open or stuck closed.

While means 130 has been embodied herein as having pump 50 and diverter valve 152 which represents the least number of components, it should be understood that means 130 may include additional pumps and valves to achieve the same functionality. For example, separate pumps may be provided for pumping reagent 23, water 29, and air. When separate pumps are utilized, it may be necessary to provide a valve for each pump. In another example, one pump may be used to pump reagent 23 to injector 24 while another pump may be used to pump regent 23 in the opposite direction. Again, it may be necessary to provide additional valves for each pump to achieve desired isolation of reagent 23 and water 29 in the various modes of operation. In yet another example, air may be supplied to injector 24 from a compressed air source, for example a pressurized air tank which is used for operation of air brakes in a vehicle. In this example, diverter valve 152 may be modified to eliminate air inlet 168 since pump 50 is not needed to pump the air. Instead, an additional valve may be provided to selectively block communication between the source of compressed air and an air inlet located between pump 50 and injector 24.

While this invention has been described in terms of preferred embodiments thereof, it is not intended to be so limited, but rather only to the extent set forth in the claims that follow.

I claim:

1. A reagent dosing system for dosing reagent into an exhaust conduit, said reagent dosing system comprising:
   an injector having an outlet configured to be in fluid communication with said exhaust conduit;
   a reagent tank configured to hold a volume of reagent;
   a water tank configured to hold a volume of water; and
   a means for 1) pumping reagent from said reagent tank to said injector for injection of reagent into said exhaust conduit and 2) pumping water from said water tank to said injector for flushing residual reagent from said injector;
   wherein said means is configured to pass air through said injector when fluid communication between said reagent tank and said injector and between said water tank and said injector is prevented; and
   wherein said means comprises:
      a pump configured to 1) pump reagent from said reagent tank to said injector for injection of reagent, 2) pump water from said water tank to said injector for flushing residual reagent from said injector; and
      3) pump air from an air inlet to said injector; and
   a valve which is moveable between 1) a first position which provides fluid communication between said reagent tank and said pump, which prevents fluid communication between said water tank and said pump, and which prevents fluid communication between said air inlet and said pump; 2) a second position which provides fluid communication between said water tank and said pump, which prevents fluid communication between said reagent tank and said pump, and which prevents fluid communication between said air inlet and said pump; and 3) a third position which provides fluid communication between said air inlet and said pump, which prevents fluid communication between said reagent tank and said pump, and which prevents fluid communication between said water tank and said pump.

2. The reagent dosing system as in claim 1, wherein said pump is configured to pump reagent from said injector to said reagent tank.

3. The reagent dosing system as in claim 2, wherein said pump is configured to pump water from said injector to said water tank.

\* \* \* \* \*